United States Patent
Takaya et al.

(10) Patent No.: US 11,740,414 B2
(45) Date of Patent: Aug. 29, 2023

(54) MULTIFIBER OPTICAL CONNECTOR AND OPTICAL CABLE CONNECTION METHOD

(71) Applicant: NIPPON TELEGRAPH AND TELEPHONE CORPORATION, Tokyo (JP)

(72) Inventors: Masaaki Takaya, Musashino (JP); Kazunori Katayama, Musashino (JP); Yoshiteru Abe, Musashino (JP); Ryo Koyama, Musashino (JP); Chisato Fukai, Musashino (JP); Yusuke Yamada, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 252 days.

(21) Appl. No.: 17/285,810

(22) PCT Filed: Oct. 9, 2019

(86) PCT No.: PCT/JP2019/039847
§ 371 (c)(1),
(2) Date: Apr. 15, 2021

(87) PCT Pub. No.: WO2020/085093
PCT Pub. Date: Apr. 30, 2020

(65) Prior Publication Data
US 2021/0341687 A1    Nov. 4, 2021

(30) Foreign Application Priority Data

Oct. 24, 2018  (JP) .................. 2018-200363

(51) Int. Cl.
*G02B 6/36* (2006.01)
*G02B 6/40* (2006.01)
*G02B 6/38* (2006.01)

(52) U.S. Cl.
CPC .......... *G02B 6/403* (2013.01); *G02B 6/3882* (2013.01)

(58) Field of Classification Search
CPC .... G02B 6/403; G02B 6/3882; G02B 6/3873; G02B 6/36
See application file for complete search history.

(56) References Cited

U.S. PATENT DOCUMENTS

| 8,727,634 B2 * | 5/2014 | Sasaki | G02B 6/3807 |
| | | | 385/71 |
| 9,470,852 B2 * | 10/2016 | Takano | G02B 6/3875 |
| 10,359,575 B1 * | 7/2019 | Li | G02B 6/389 |

FOREIGN PATENT DOCUMENTS

| JP | 2011150072 A | 8/2011 |
| JP | 2015169747 A | 9/2015 |

* cited by examiner

*Primary Examiner* — Jennifer Doan
(74) *Attorney, Agent, or Firm* — Harness, Dickey & Pierce, P.L.C.

(57) ABSTRACT

An object is to provide a multifiber optical connector and an optical cable connection method capable of reducing a connection time and reducing an installation space of a connection portion. The multifiber optical connector according to the present invention includes three position adjustment units, and performs rough alignment to fine alignment of optical fiber end faces by using sequentially these position adjustment units when optical cables are connected. The multifiber optical connector simultaneously connects the end faces of the plurality of optical fibers included in the optical cables, and thus, an extra optical fiber tape is not present, and a closure needed in the related art is not necessary.

7 Claims, 6 Drawing Sheets

MULTIFIBER OPTICAL CONNECTOR AND OPTICAL CABLE CONNECTION METHOD

CROSS REFERENCE TO RELATED APPLICATIONS

This application is a 371 U.S. National Phase of International Application no. PCT/JP2019/039847, filed Oct. 9, 2019, which claims priority to Japanese Patent Application No. 2018-200363, filed Oct. 24, 2018. The entire disclosures of the above applications are incorporated herein by reference.

TECHNICAL FIELD

The present disclosure relates to a multifiber optical connector and an optical cable connection method for connecting optical cables.

BACKGROUND ART

Optical cables are currently used in various locations, and optical cables such as 400 fibers, 1000 fibers, and 2000 fibers have also been practiced. In a case where an optical fiber is installed, it is exceedingly difficult to install with one cable when the installation distance is extended, and it is necessary to provide a connection point for each certain distance. Optical fibers included in the optical cables mainly have a tape shape, and a technology for collectively connecting four fibers or eight fibers has been currently practiced. At this time, a fusion splicing for connecting the optical fibers by physically melting the optical fibers or an MT connector connection for attaching MT connector ferrules to ends of the optical fibers is used as a connection method (FIG. 1).

An MT connector 1 of FIG. 1 is a technology for arraying MT connector ferrules 2 to which an optical fiber tape 6 is attached with high accuracy by inserting guide pins 3 into guide holes 4 and adjusting positions of the optical fibers 5 with high accuracy. The optical fibers are fixed to the MT connector ferrules by an adhesive 7. The minimum units of the fusion splicing and the MT connector connection are four fibers or eight fibers, and thus, there is a problem that it takes time and labor to perform a connection work.

When the optical cables are connected, a housing that protects connection portions, for example, a closure (FIG. 2) that houses the connection portions is required. A closure 9 of FIG. 2 includes a housing portion 10, optical cable gripping portions 11, and a extra optical fiber tape accommodation portion 12, and connection portions 15 are housed in the housing. Thus, there is a disadvantage that the connection portion has a diameter many time larger than the optical cable.

Various technologies have been proposed for the purpose of reducing sizes of the connection portions of the optical cables and further reducing a connection time. For example, Patent Literature 1 proposes an optical closure having a new structure for the purpose of reducing a size of an optical connection portion. Meanwhile, Patent Literature 2 proposes a technology for collectively connecting multifiber optical fibers to reduce a connection working time.

CITATION LIST

Patent Literature

Patent Literature 1: JP 2015-169747 A
Patent Literature 2: JP 2011-150072 A

SUMMARY OF THE INVENTION

Technical Problem

As described above, when the multifiber optical fiber cable is installed, there is a problem that the connection time is long in the required connection work, and that the connection portion is large and an installation space is required. Thus, in order to solve the aforementioned problems, an object of the present invention is to provide a multifiber optical connector and an optical cable connection method capable of reducing a connection time and reducing an installation space of a connection portion.

Means for Solving the Problem

In order to achieve the aforementioned object, a multifiber optical connector according to the present invention includes three position adjustment units, and performs rough alignment to fine alignment of optical fiber end faces by using sequentially these position adjustment units when optical cables are connected.

Specifically, a multifiber optical connector according to the present invention is a multifiber optical connector that connects a plurality of optical fiber end faces appearing on a connection surface of a first connector unit and a plurality of optical fiber end faces appearing on a connection surface of a second connector unit by connecting the first connector unit and the second connector unit. The connector includes a plurality of optical connector ferrules that group optical fiber end faces at the connection surface of the first connector unit and the connection surface of the second connector unit, respectively, a plurality of optical connector housings that each houses one optical connector ferrule of the plurality of optical connector ferrules, a first alignment unit that adjusts positions of the connection surface of the first connector unit and the connection surface of the second connector unit, a second alignment unit that adjusts positions of the plurality of optical connector housings facing each other after the first alignment unit adjusts the positions of the connection surface of the first connector unit and the connection surface of the second connector unit, and a third alignment unit that adjusts positions of the plurality of optical connector ferrules facing each other after the second alignment unit adjusts the positions of the plurality of optical connector housings facing each other.

An optical cable connection method according to the present invention is an optical cable connection method of connecting optical cables by using a multifiber optical connector that connects a plurality of optical fiber end faces appearing on a connection surface of a first connector unit and a plurality of optical fiber end faces appearing on a connection surface of a second connector unit by connecting the first connector unit and the second connector unit. The method includes grouping, by the multifiber optical connector, optical fiber end faces of optical fibers included in the optical cables at the connection surface of the first connector unit and the connection surface of the second connector unit, respectively, by using one optical connector ferrule of a plurality of optical connector ferrules housed in a plurality of optical connector housings, adjusting, by the multifiber optical connector, positions of the connection surface of the first connector unit and the connection surface of the second connector unit, adjusting, by the multifiber optical connector, positions of the plurality of optical connector housings facing each other after the positions of the connection surface of the first connector unit and the connection surface of the second connector unit are adjusted, and adjusting, by the multifiber optical connector, positions of the plurality of optical connector ferrules facing each other after the positions of the plurality of optical connector housings facing each other are adjusted.

When the first connector unit and the second connector unit are joined, the multifiber optical connector automatically performs rough alignment to fine alignment of the optical fiber end faces. The multifiber optical connector simultaneously connects the end faces of the plurality of optical fibers included in the optical cables, and thus, an extra optical fiber tape is not present, and a closure needed in the related art is not necessary. Accordingly, the present invention can provide a multifiber optical connector and an optical cable connection method capable of reducing the connection time and reducing the installation space of the connection portion.

The alignment units of the multifiber optical connector according to the present invention are as follows.

The first alignment unit includes first guide pins and first guide holes arranged on the connection surface of the first connector unit and the connection surface of the second connector unit, the first guide pins being fitted to the first guide holes.

The second alignment unit includes tapers formed on each of the plurality of optical connector housings, and a housing slight-movement structure that allows an optical connector housing of the plurality of optical connector housings to be movable in a direction parallel to the connection surface of the first connector unit and the connection surface of the second connector unit, and when the plurality of optical connector housings facing each other are fitted together, first force is applied to the optical connector housing by the tapers, the optical connector housing moves by the housing slight-movement structure actuated by the first force to eliminate a deviation between the plurality of optical connector housings facing each other.

The third alignment unit includes second guide pins and second guide holes arranged on a joining surface of each of the plurality of optical connector ferrules on which the optical fiber end faces appear, the second guide pins being fitted to the second guide holes, a ferrule slight-movement structure that allows an optical connector ferrule of the plurality of optical connector ferrules to be movable in a direction parallel to the connection surface of the first connector unit and the connection surface of the second connector unit, and a pressing structure that applies pressing force such that the plurality of optical connector ferrules are in close contact with each other on a plurality of the joining surfaces, and when the second guide pins and the second guide holes of the plurality of optical connector ferrules facing each other are fitted together, second force is applied to the optical connector ferrule by deviations between the second guide pins and the second guide holes, the optical connector ferrule moves by the ferrule slight-movement structure actuated by the second force to eliminate a deviation between the plurality of optical connector ferrules facing each other, and the pressing structure applies the pressing force to the optical connector ferrule.

The alignment procedures of the optical cable connection method according to the present invention are as follows.

The positions of the connection surface of the first connector unit and the connection surface of the second connector unit are adjusted by using first guide pins and first guide holes arranged on the connection surface of the first connector unit and the connection surface of the second connector unit, the first guide pins being fitted to the first guide holes. The positions of the plurality of optical connector housings facing each other are adjusted by using tapers formed on each of the plurality of optical connector housings and a housing slight-movement structure that allows an optical connector housing of the plurality of optical connector housings to be movable in a direction parallel to the connection surface of the first connector unit and the connection surface of the second connector unit are used, and when the plurality of optical connector housings facing each other are fitted together, first force is applied to the optical connector housing by the tapers, the optical connector housing moves by the housing slight-movement structure actuated by the first force to eliminate a deviation between the plurality of optical connector housings facing each other. The positions of the plurality of optical connector ferrules facing each other are adjusted by using second guide pins and second guide holes arranged on a joining surface of each of the plurality of optical connector ferrules on which the optical fiber end faces appear, the second guide pins being fitted to the second guide holes, a ferrule slight-movement structure that allows an optical connector ferrule of the plurality of optical connector ferrules to be movable in a direction parallel to the connection surface of the first connector unit and the connection surface of the second connector unit are used, and a pressing structure that applies pressing force such that the plurality of optical connector ferrules are in close contact with each other on a plurality of the joining surfaces, and when the second guide pins and the second guide holes of the plurality of optical connector ferrules facing each other are fitted together, second force is applied to the optical connector ferrule by deviations between the second guide pins and the second guide holes, the optical connector ferrule moves by the ferrule slight-movement structure actuated by the second force to eliminate a deviation between the plurality of optical connector ferrules facing each other, and the pressing structure applies the pressing force to the optical connector ferrule.

The multifiber optical connector according to the present invention preferably further includes an elastic solid matching material that is arranged on the connection surface of the first connector unit and the connection surface of the second connector unit, and has a refractive index equal to a refractive index of a core appearing on each of the optical fiber end faces. A gap between the connected optical fiber end faces is buried by the solid matching material, and a connection impact can be cushioned.

The inventions described above can be combined with each other as far as possible.

Effects of the Invention

The present invention can greatly decrease a connection workload by providing a mechanism that collectively connects optical fibers to a multifiber optical cable, and can greatly decrease a space of a connection portion by eliminating a closure needed for the connection portion. That is, the present invention can provide a multifiber optical connector and an optical cable connection method capable of reducing a connection time and reducing an installation space of a connection portion.

DESCRIPTION OF EMBODIMENTS

Hereinafter, an embodiment of the present invention will be described with reference to the drawings. The embodiment to be described below are examples of the present invention, and the present invention is not limited to the following embodiment. In this specification and the drawings, it is assumed that constituent elements having the identical reference signs are identical.

Figure 1:
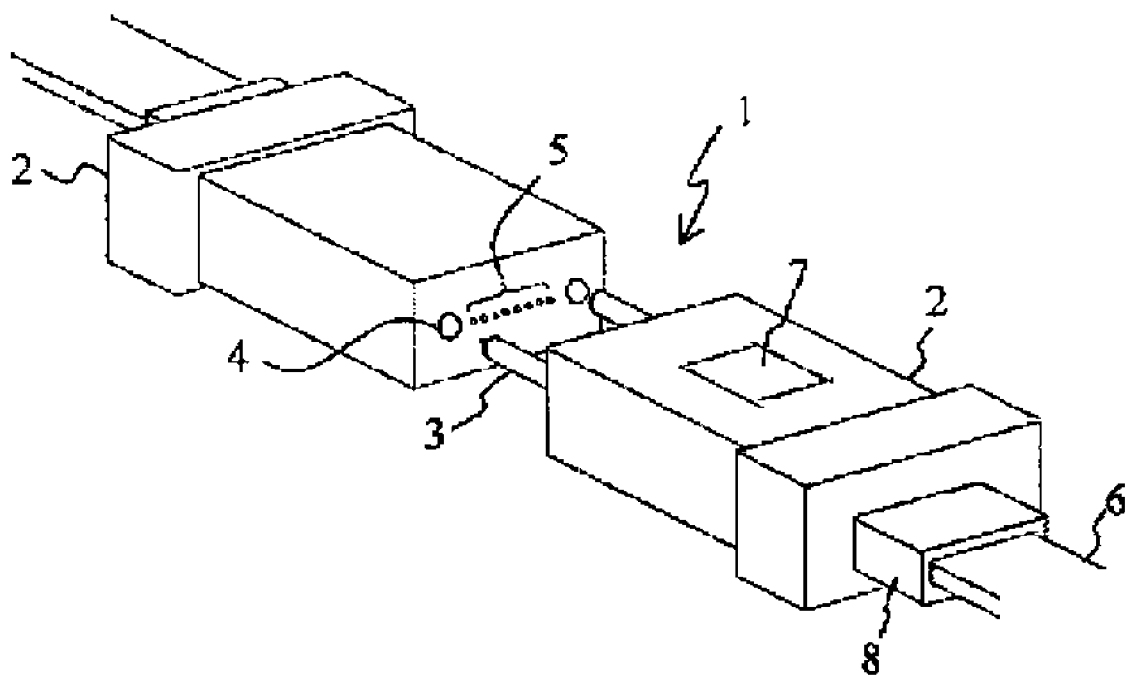
FIG. 1 is a diagram for describing an MT connector.
Figure 2:
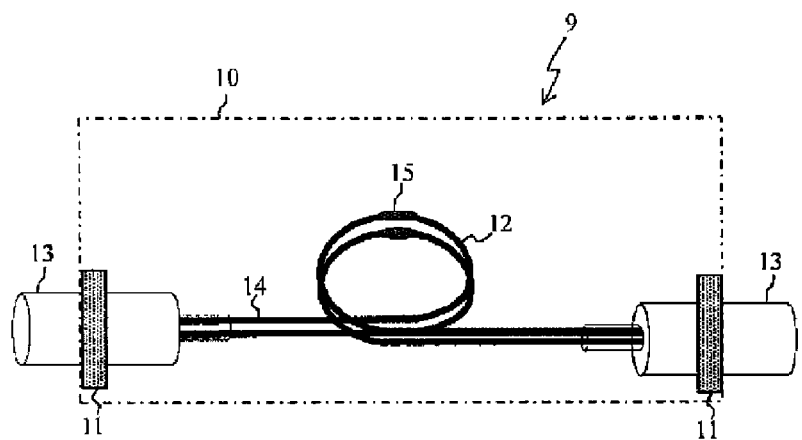
FIG. 2 is a diagram for describing an optical closure.
Figure 3:
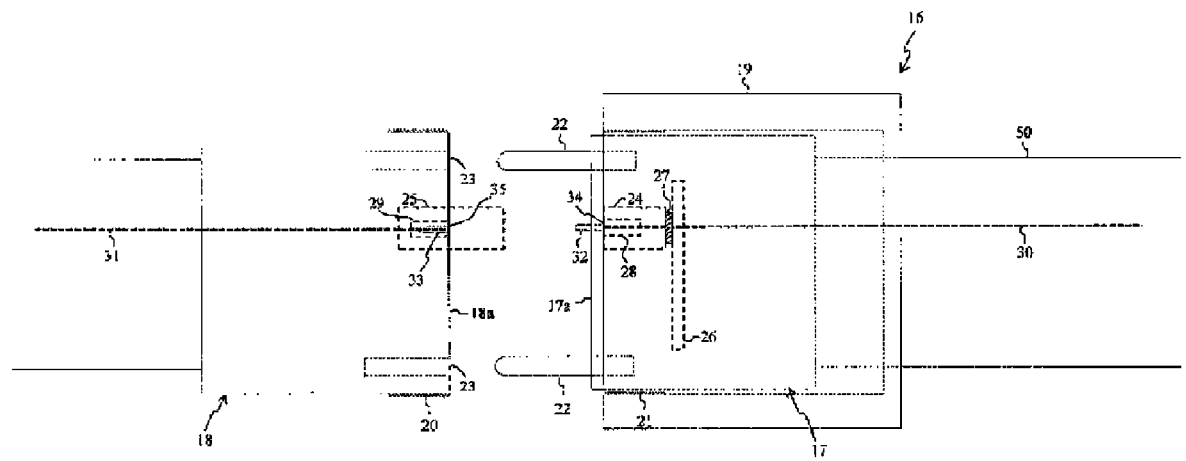
FIG. 3 is a diagram for describing a multifiber optical connector according to the present invention.

FIG. 3 is a diagram for describing an optical connector 16 for an optical cable of the present embodiment. The optical connector 16 for an optical cable is a multifiber optical connector that connects a plurality of optical fiber end faces appearing on a connection surface 17a of a first connector unit 17 and a plurality of optical fiber end faces appearing on a connection surface 18a of a second connector unit 18 by connecting the first connector unit 17 with the second connector unit 18, and has the following characteristics.
Optical connector ferrules (28 and 29) that group the optical fiber end faces at the connection surfaces (17a and 18a).
A plurality of optical connector housings (24 and 25) each housing one of the optical connector ferrules.
A first alignment unit that adjusts positions of the connection surface 17a of the first connector unit 17 with the connection surface 18a of the second connector unit 18.
A second alignment unit that adjusts positions of the optical connector housings (24 and 25) facing each other after the first alignment unit adjusts the positions of the connection surface 17a of the first connector unit 17 with the connection surface 18a of the second connector unit 18.
A third alignment unit that adjusts positions of the optical connector ferrules (28 and 29) facing each other after the second alignment unit adjusts the positions of the facing optical connector housings (24 and 25).

The multifiber optical connector 16 for an optical cable includes a female (second) optical connector unit 18 and a male (first) optical connector unit 17 which are attached to optical cables 50, and a cover 19. After the connection between the female optical connector unit 18 and the male optical connector unit 17 is completed, a screw portion 20 formed on the female optical connector and a screw portion 21 formed on the cover 19 mesh with each other. Thus, a waterproof function is achieved by pressing the female optical connector unit 18 and the male optical connector unit 17 to each other in an axial direction and covering a connection portion of the female optical connector unit 18 and the male optical connector unit 17.

Guide pins 22 and guide holes 23 are provided in the connection surface 17a of the male optical connector unit 17 and the connection surface 18a of the female optical connector unit 18, respectively. Position adjustment and rough alignment of the connection is initially realized by inserting the guide pins 22 into the guide holes 23 in the case of the connection.

The optical connector housings (24 and 25) are respectively included in the male optical connector unit 17 and the female optical connector unit 18. The optical connector housing 24 is attached to a panel 26 in the connector, and the optical connector housing 24 is movable in a direction parallel to the connection surfaces (17a and 18a).

The optical connector housings (24 and 25) include the optical connector ferrules (28 and 29) that fix optical fiber tapes (30 and 31) housed within the optical cables, respectively. Positions of the optical connector ferrules (28 and 29) are adjusted by a guide pin 32 and a guide hole 33, respectively, and optical fiber end faces (34 and 35) respectively held by end faces of the optical connector ferrules (28 and 29) are finally connected with high accuracy.

FIGS. 4 to 7 are diagrams for describing a connection sequence of the multifiber optical connector 16. The connection of the optical cables using the multifiber optical connector 16 is performed in the following three stages.

Figure 4:
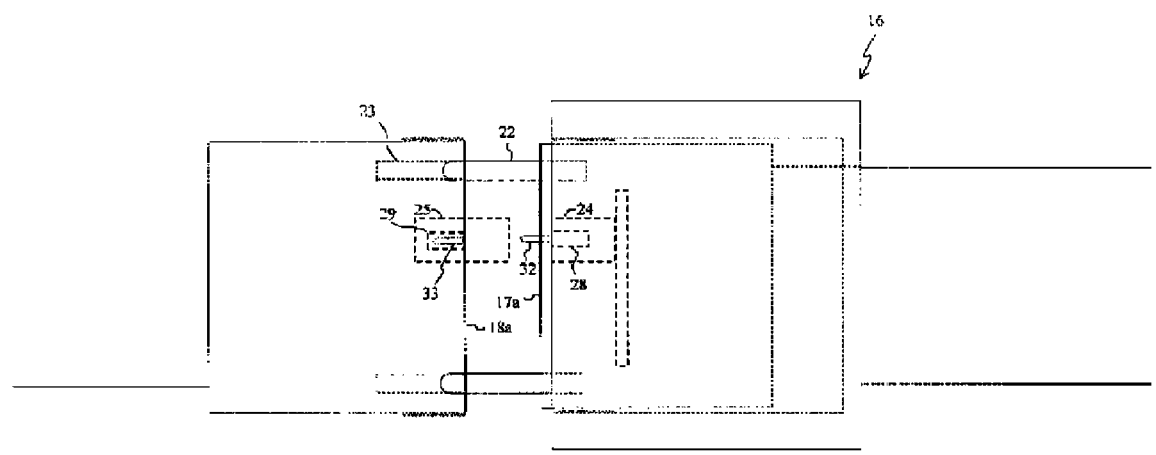
FIG. 4 is a diagram for describing the multifiber optical connector according to the present invention.

The first stage is a first alignment procedure for adjusting the positions of the connection surface 17a of the first connector unit 17 and the connection surface 18a of the second connector unit 18 (FIG. 4). In the first alignment procedure, the guide pins 22 are inserted into the guide pin holes 23, and the alignment of the first stage in the connection is performed. The optical connector housings (24 and 25) can be fitted by this alignment of the first stage. The optical connector housings (24 and 25) are, for example, MT connector ferrules.

Figure 5:
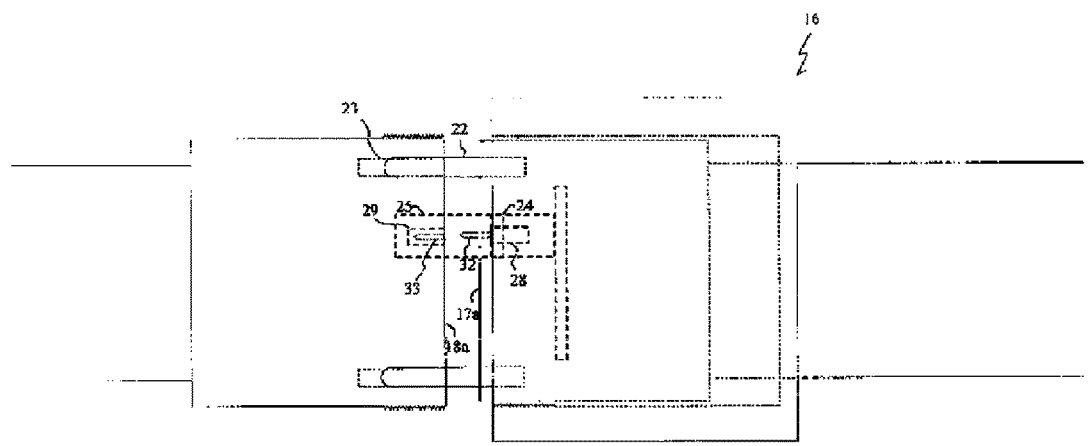
FIG. 5 is a diagram for describing the multifiber optical connector according to the present invention.

The second stage is a second alignment procedure for adjusting the positions of the facing optical connector housings (24 and 25) (FIG. 5). In the second alignment procedure, the optical connector housings (24 and 25) are fitted to each other, and the alignment of the second stage is performed. The guide pin 32 and the guide hole 33 of the optical connector ferrules (28 and 29) can be fitted by this alignment of the second stage.

Figure 6:
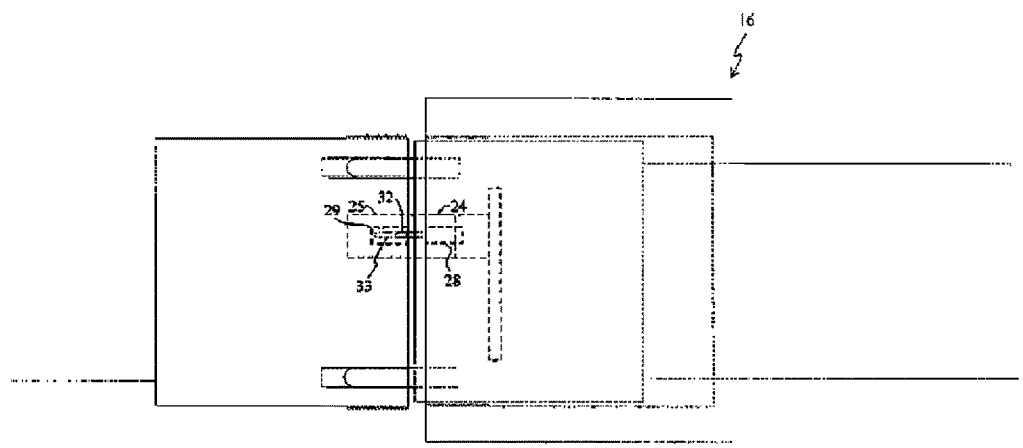
FIG. 6 is a diagram for describing the multifiber optical connector according to the present invention.

The third stage is a third alignment procedure for adjusting the positions of the facing optical connector ferrules (28 and 29) (FIG. 6). In the third alignment procedure, the guide pin 32 is inserted into the guide hole 33, and the alignment of the third stage is performed. By this alignment of the third stage, the final alignment of the optical fibers is performed, and a high-accuracy alignment of the optical fibers is achieved.

Figure 7:
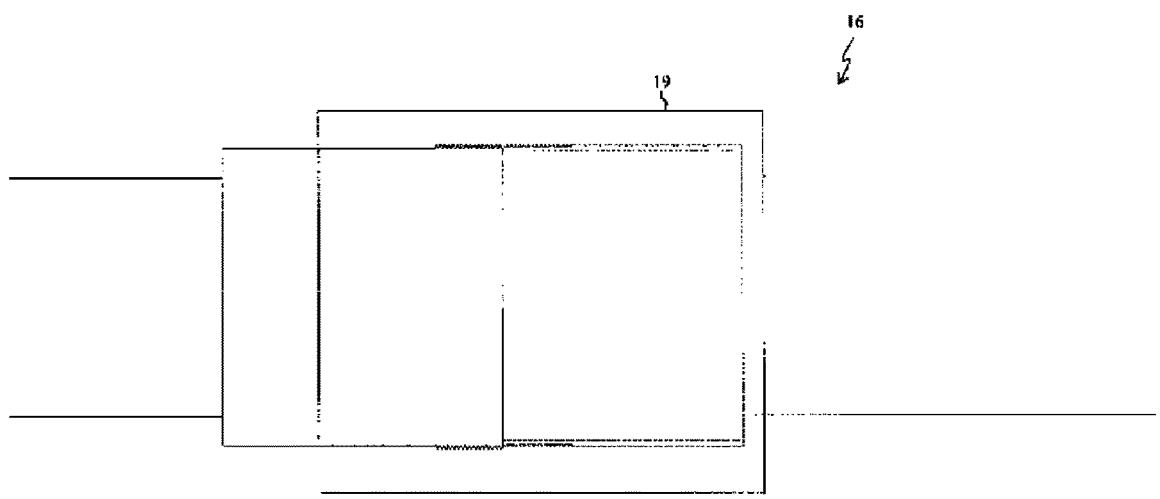
FIG. 7 is a diagram for describing the multifiber optical connector according to the present invention.

In the third alignment procedure, the connection portion is protected by the cover 19 after the optical fiber end faces of the facing optical connector units (the male optical connector unit 17 and the female optical connector unit 18) are mated together (FIG. 7).

Figure 8:
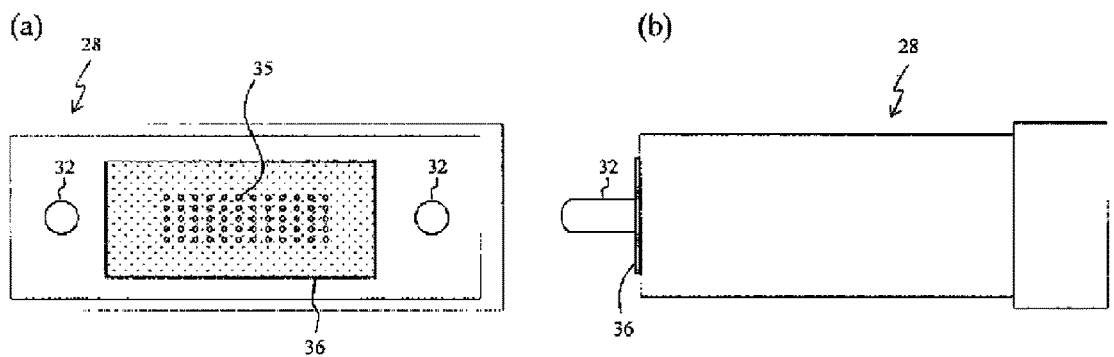
FIG. 8 is a diagram for describing ferrules included in the multifiber optical connector according to the present invention.

FIG. 8 illustrates two side views for describing the optical connector ferrule 28. FIG. 8(*a*) is a front view of the optical connector ferrule when viewed from the facing optical connector ferrule 29 side, and FIG. 8(*b*) is a side view. The optical connector ferrule 28 is included in the optical connector housing 24 of the male optical connector unit 17. As illustrated in FIG. 8, an elastic sheet 36 having a refractive index equal to a refractive index of the optical fiber is adhered to the end face. The sheet 36 cushions an impact when the male optical connector unit 17 and the female optical connector unit 18 are fitted to each other, and eliminates a gap between the connected optical fibers. Accordingly, it is possible to improve performance.

Figure 9:
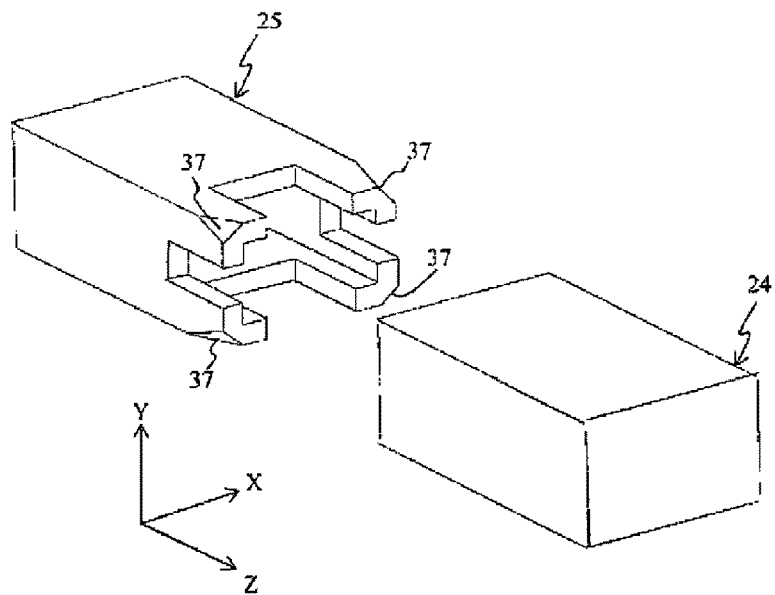
FIG. 9 is a diagram for describing housings included in the multifiber optical connector according to the present invention.
Figure 10:
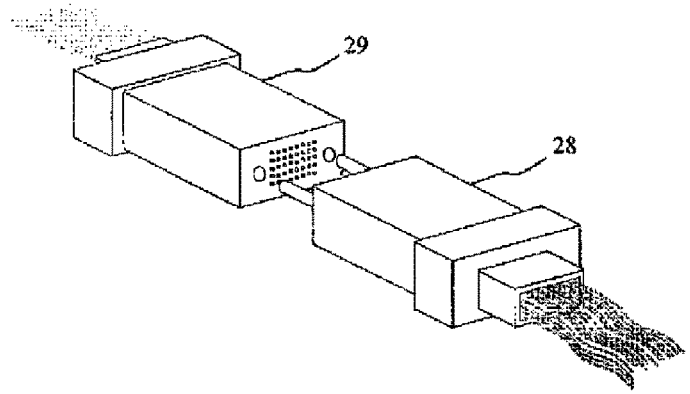
FIG. 10 is a diagram for describing the ferrules included in the multifiber optical connector according to the present invention.

FIG. 9 is a diagram for describing the optical connector housings (24 and 25). The optical connector housings (24 and 25) include the MT connector ferrules (28 and 29) illustrated in FIG. 10, respectively.

Figure 11:
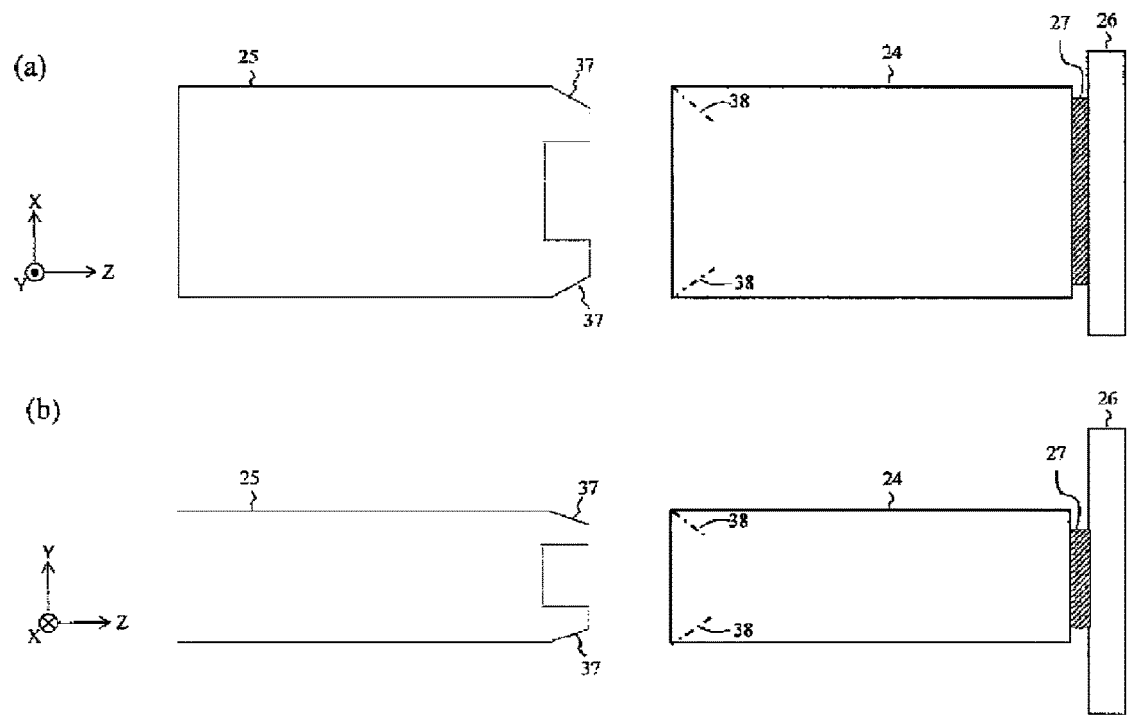
FIG. 11 is a diagram for describing the housings included in the multifiber optical connector according to the present invention.
Figure 12:
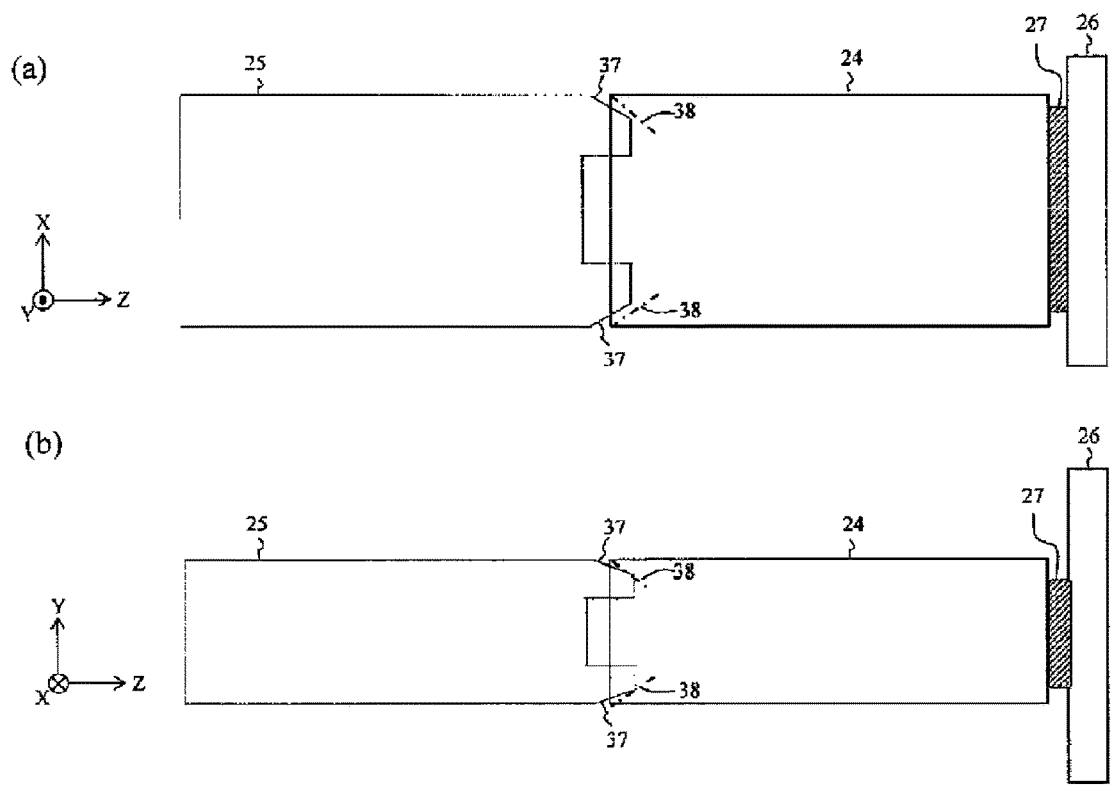
FIG. 12 is a diagram for describing the housings included in the multifiber optical connector according to the present invention.

FIGS. 11 and 12 are diagrams for describing the second alignment unit. The second alignment unit includes tapers (37 and 38) respectively formed on the optical connector housings (24 and 25), and a housing slight-movement structure 27 that allows the optical connector housing 24 to be movable in the direction parallel to the connection surface 17*a*. In the second alignment unit, when the optical connector housings (24 and 25) are fitted to each other, force is applied to the optical connector housing 24 by the tapers (37 and 38), the optical connector housing 24 moves by the housing slight-movement structure 27 actuated by this force, and a deviation between the optical connector housing 24 and the facing optical connector housing 25 is eliminated.

A diagram when a state before the optical connector housings (24 and 25) are fitted is viewed from the top is illustrated in FIG. 11(*a*), and a diagram when this state is observed from the side is illustrated in FIG. 11(*b*). Here, a connection direction of the male optical connector unit 17 and the female optical connector unit 18 is a Z-axis direction, a direction viewed from the top is a Y-axis direction, and a direction viewed from the side is an X-axis direction.

The taper 38 is provided on the optical connector housing 24, and the taper 37 is provided on the optical connector housing 25. The optical connector housing 24 is fixed to the housing slight-movement structure 27 to be movable in the X-axis direction and the Y-axis direction between the panel 26 and the optical connector housing.

As illustrated in FIG. 12, when the housings (24 and 25) are fitted to each other, force is applied to the optical connector housing 24 by the tapers (37 and 38). The housing slight-movement structure 27 moves the optical connector housing 24 in a direction of the force by the force, and thus, the optical connector housings are fitted while modifying a position between the optical connector housings.

Figure 13:
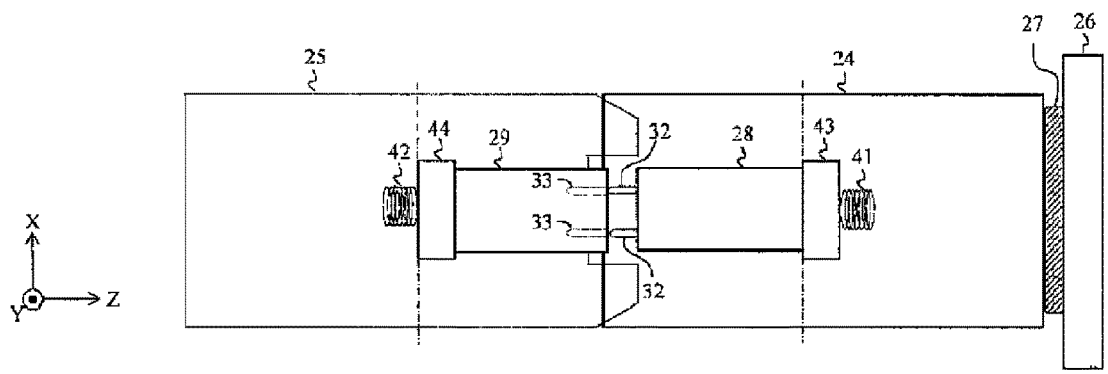
FIG. 13 is a diagram for describing the housings and the ferrules included in the multifiber optical connector according to the present invention.
Figure 14:
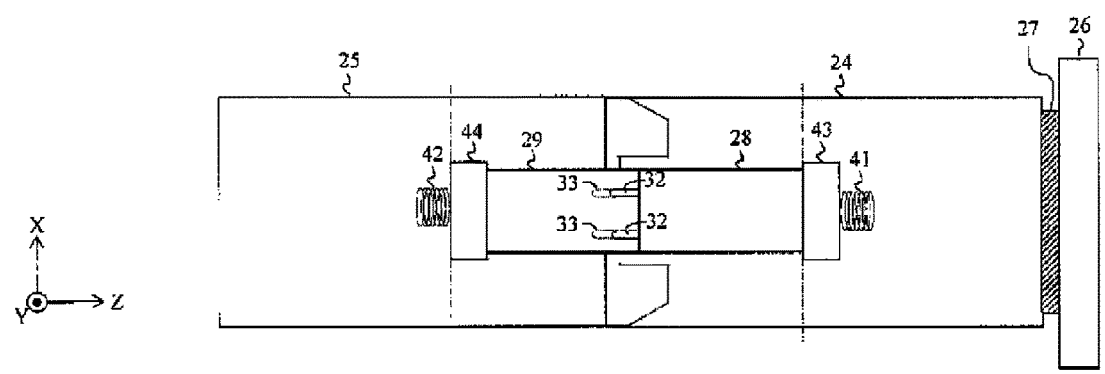
FIG. 14 is a diagram for describing the housings and the ferrules included in the multifiber optical connector according to the present invention.

FIGS. 13 and 14 are diagrams for describing the third alignment unit. FIG. 13 illustrates a state before the optical connector ferrules (28 and 29) are fitted to each other, and FIG. 14 illustrates a state after the optical connector ferrules are fitted (28 and 29). The third alignment unit has the following characteristics.

First, the third alignment unit includes second guide pins 32 and second guide holes 33 arranged on joining surfaces of the optical connector ferrules (28 and 29) on which the optical fiber end faces appear, the second guide pins are fitted to the second guide holes, ferrule slight-movement structures (43 and 44) that allow the optical connector ferrules (28 and 29) to be movable in the direction (Z-axis direction) parallel to the connection surfaces, and pressing structures (41 and 42) that apply pressing force such that the optical connector ferrules (28 and 29) are in close contact with each other on the joining surfaces.

In the third alignment unit, when the second guide pins 32 and the second guide holes 33 of the facing optical connector ferrules (28 and 29) are fitted to each other, force is applied to the optical connector ferrules (28 and 29) due to deviations between the second guide pins 32 and the second guide holes 33, the optical connector ferrules (28 and 29) move by the ferrule slight-movement structures (43 and 44) actuated by the force, a deviation between the facing optical connector ferrules is eliminated, and the pressing structures (41 and 42) apply the pressing force to the optical connector ferrules (28 and 29).

In FIGS. 13 and 14, the housing is illustrated as being transparent such that the optical connector ferrules (28 and 29) within the optical connector housings (24 and 25) are observed. The optical connector ferrules (28 and 29) are respectively included in the optical connector housings (24 and 25). The optical connector ferrules (28 and 29) are slightly movable in the X-axis direction and the Y-axis direction by the ferrule slight-movement structures (43 and 44).

After the optical connector housings (24 and 25) are fitted to each other, the guide pins 32 and the guide pin holes 33 are fitted to each other, and thus, the alignment of the third stage is achieved. At this time, positions of the optical connector ferrules (28 and 29) are adjusted by the ferrule slight-movement structures (43 and 44). The optical connector ferrules (28 and 29) are movable in the Z-axis direction by the pressing structures (41 and 42), and the pressing force is applied in the direction of the connection surfaces. For example, the pressing structures (41 and 42) are springs. Thus, after the alignment of the third stage is performed, the optical connector ferrules (28 and 29) are pressed in the connection direction, that is, the optical fiber end faces are pressed to each other.

In summary, an optical cable connection method is as follows.

In the first alignment procedure, the positions are adjusted by using first guide pins 22 and first guide holes 23 arranged on the connection surface of the first connector unit 17 and the connection surface of the second connector unit 18, the first guide pins being fitted to the first guide holes.

In the second alignment procedure, the tapers (37 and 38) formed on the optical connector housings (24 and 25) and the housing slight-movement structure 27 that allows the optical connector housing (24 or 25) to be movable in the directions (X and Y directions) parallel to the connection surfaces (17*a* and 18*a*) are used, and when the optical connector housings (24 and 25) are fitted to each other, the force is applied to the optical connector housing 24 by the tapers (37 and 38), the optical connector housing 24 moves by the housing slight-movement structure 27 actuated by the force, and the deviation between the facing optical connector housings. In the third alignment procedure, the pressing force is applied to the ferrules as follows. That is, the second guide pins 32 and the second guide holes 33 arranged on the joining surfaces of the optical connector ferrules (28 and 29) on which the optical fiber end faces appear, the second guide pins being fitted to the second guide holes, the ferrule slight-movement structures (43 and 44) that allow the optical connector ferrules (28 and 29) to be movable in the directions (X and Y directions) parallel to the connection surfaces (17*a* and 18*a*), and the pressing structures (41 and 42) that apply the pressing force such that the optical connector ferrules (28 and 29) are in close contact with each other on the joining surfaces are used.

When the second guide pins 32 and the second guide holes 33 of the optical connector ferrules (28 and 29) are fitted to each other, force is applied to the optical connector ferrules (28 and 29) due to the deviations between the second guide pins 32 and the second guide holes 33, the optical connector ferrules (28 and 29) move by the ferrule slight-movement structures (43 and 44) actuated by the force, the deviation between the facing optical connector ferrules is eliminated, and the pressing structures (41 and 42) apply the pressing force to the optical connector ferrules (28 and 29).

Figure 15:
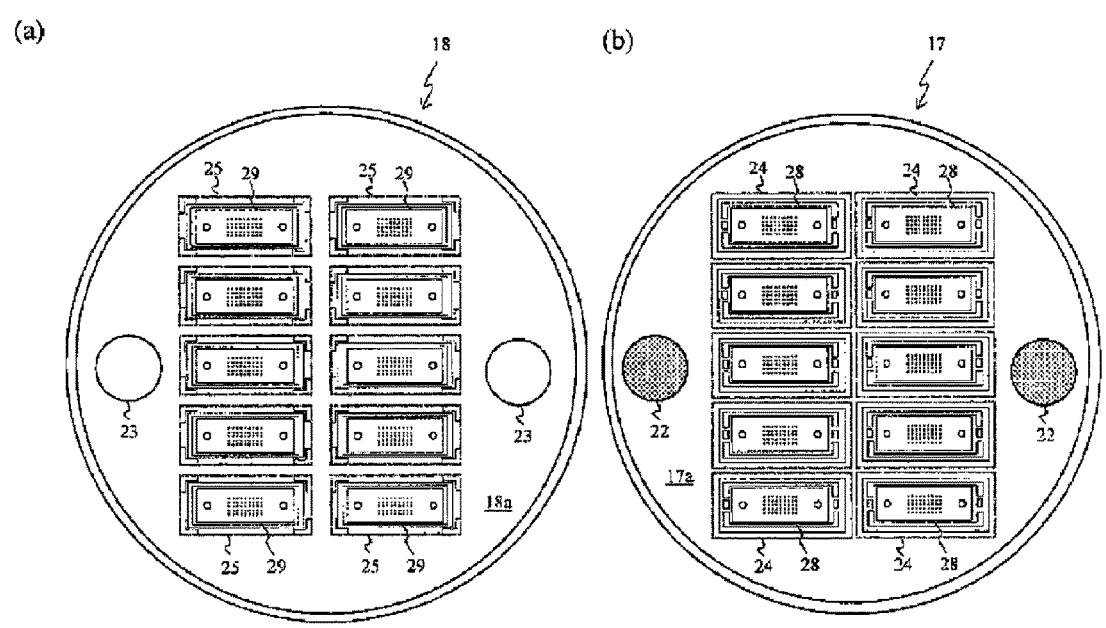
FIG. 15 is a diagram for describing an example of the multifiber optical connector according to the present invention.

FIG. 15 is a diagram of the multifiber optical connector 16 viewed from the connection surface. FIG. 15(a) illustrates the connection surface 18a of the female (second) optical connector unit 18, and FIG. 15(b) illustrates the connection surface 17a of the male (first) optical connector unit 17. The plurality of optical connector housings (24) and the plurality of optical connector housings (25) are respectively arranged on the male optical connector unit 17 and the female optical connector unit 18, and thus, an ultra-multifiber optical fiber can be connected.

APPENDIX

Hereinafter, the multifiber optical connector and the connection method of the present embodiment are described.

Object

An object of the present invention is to allow a multifiber optical fiber to be connected in a short time and to greatly reduce a space of the connection portion.

Means

The present multifiber optical connector includes one or more optical connector housings that house multifiber optical connector ferrules, respectively, and a first guide pin and a guide hole for arraying each optical connector housing. Each optical connector housing arrays each optical connector ferrule housed in each optical connector housing. Each optical connector ferrule includes a second guide pin and a second guide hole for aligning a plurality of optical fibers housed in each optical connector ferrule.

The present connection method is a method of connecting optical cables using the multifiber optical connector, and includes a first step of arraying each optical connector housing by a first guide pin and a guide hole, a second step of arraying optical connector ferrules by the optical connector housings, and a third step of aligning each optical fiber by a second guide pin and a second guide hole.

Effects of the Invention

When the optical connector for an optical cable is used, the multifiber optical fiber connection can be achieved in a short time. The optical closure needed in the related art is not necessary, and the space of the connection portion can be greatly reduced.

REFERENCE SIGNS LIST

1 MT connector,
2 MT connector ferrule,
3 Guide pin,
4 Guide hole,
5 Optical fiber end face,
6 Optical fiber tape,
7 Adhesive addition window,
8 Optical connector boot,
9 Optical closure,
10 Optical closure housing,
11 Optical cable gripping portion,
12 Optical fiber accommodation portion,
13 Optical cable,
14 Optical fiber tape,
15 Connection portion,
16 Multifiber optical connector for optical cable,
17 Male optical connector unit 17,
17a Connection surface,
18 Female optical connector unit 18,
18a Connection surface,
19 Cover,
20 Screw portion,
21 Screw portion,
22 Guide pin,
23 Guide hole,
24 Optical connector housing,
25 Optical connector housing,
26 Optical connector attachment panel,
27 Housing slight-movement structure,
28 Optical connector ferrule,
29 Optical connector ferrule,
30 Optical fiber tape,
31 Optical fiber tape,
32 Guide pin,
33 Guide hole,
34 Optical fiber end face,
35 Optical fiber end face,
36 Elastic refractive index matching,
37 Optical connector housing taper portion,
38 Optical connector housing taper portion,
41 Spring portion,
42 Spring portion,
43 Ferrule slight-movement structure,
44 Ferrule slight-movement structure,
50 Optical cable

The invention claimed is:

1. A multifiber optical connector that connects a plurality of optical fiber end faces appearing on a connection surface of a first connector unit and a plurality of optical fiber end faces appearing on a connection surface of a second connector unit by connecting the first connector unit and the second connector unit, the connector comprising:
    a plurality of optical connector ferrules configured to group optical fiber end faces at the connection surface of the first connector unit and the connection surface of the second connector unit, respectively;
    a plurality of optical connector housings configured to each house one optical connector ferrule of the plurality of optical connector ferrules;
    a first alignment unit configured to adjust positions of the connection surface of the first connector unit and the connection surface of the second connector unit;
    a second alignment unit configured to adjust positions of the plurality of optical connector housings facing each other after the first alignment unit adjusts the positions of the connection surface of the first connector unit and the connection surface of the second connector unit; and
    a third alignment unit configured to adjust positions of the plurality of optical connector ferrules facing each other after the second alignment unit adjusts the positions of the plurality of optical connector housings facing each other.

2. The multifiber optical connector according to claim 1, wherein
the first alignment unit includes first guide pins and first guide holes arranged on the connection surface of the first connector unit and the connection surface of the second connector unit, the first guide pins being fitted to the first guide holes.

3. The multifiber optical connector according to claim 1, wherein
the second alignment unit includes
tapers formed on each of the plurality of optical connector housings, and
a housing slight-movement structure that allows an optical connector housing of the plurality of optical connector housings to be movable in a direction parallel to the connection surface of the first connector unit and the connection surface of the second connector unit, and
when the plurality of optical connector housings facing each other are fitted together, first force is applied to the optical connector housing by the tapers, the optical connector housing moves by the housing slight-movement structure actuated by the first force to eliminate a deviation between the plurality of optical connector housings facing each other.

4. The multifiber optical connector according to claim 1, wherein
the third alignment unit includes
second guide pins and second guide holes arranged on a joining surface of each of the plurality of optical connector ferrules on which the optical fiber end faces appear, the second guide pins being fitted to the second guide holes, a ferrule slight-movement structure that allows an optical connector ferrule of the plurality of optical connector ferrules to be movable in a direction parallel to the connection surface of the first connector unit and the connection surface of the second connector unit, and a pressing structure that applies pressing force such that the plurality of optical connector ferrules are in close contact with each other on a plurality of the joining surfaces, and
when the second guide pins and the second guide holes of the plurality of optical connector ferrules facing each other are fitted together, second force is applied to the optical connector ferrule by deviations between the second guide pins and the second guide holes, the optical connector ferrule moves by the ferrule slight-movement structure actuated by the second force to eliminate a deviation between the plurality of optical connector ferrules facing each other, and the pressing structure applies the pressing force to the optical connector ferrule.

5. The multifiber optical connector according to claim 1, further comprising:
an elastic solid matching material that is arranged on the connection surface of the first connector unit and the connection surface of the second connector unit, and has a refractive index equal to a refractive index of a core appearing on each of the optical fiber end faces.

6. An optical cable connection method of connecting optical cables by using a multifiber optical connector that connects a plurality of optical fiber end faces appearing on a connection surface of a first connector unit and a plurality of optical fiber end faces appearing on a connection surface of a second connector unit by connecting the first connector unit and the second connector unit, the method comprising:
grouping, by the multifiber optical connector, optical fiber end faces of optical fibers included in the optical cables at the connection surface of the first connector unit and the connection surface of the second connector unit, respectively, by using one optical connector ferrule of a plurality of optical connector ferrules housed in a plurality of optical connector housings;
adjusting, by the multifiber optical connector, positions of the connection surface of the first connector unit and the connection surface of the second connector unit;
adjusting, by the multifiber optical connector, positions of the plurality of optical connector housings facing each other after the positions of the connection surface of the first connector unit and the connection surface of the second connector unit are adjusted; and
adjusting, by the multifiber optical connector, positions of the plurality of optical connector ferrules facing each other after the positions of the plurality of optical connector housings facing each other are adjusted.

7. The optical cable connection method according to claim 6, wherein
the positions of the connection surface of the first connector unit and the connection surface of the second connector unit are adjusted by using first guide pins and first guide holes arranged on the connection surface of the first connector unit and the connection surface of the second connector unit, the first guide pins being fitted to the first guide holes,
the positions of the plurality of optical connector housings facing each other are adjusted by using tapers formed on each of the plurality of optical connector housings and a housing slight-movement structure that allows an optical connector housing of the plurality of optical connector housings to be movable in a direction parallel to the connection surface of the first connector unit and the connection surface of the second connector unit are used, and when the plurality of optical connector housings facing each other are fitted together, first force is applied to the optical connector housing by the tapers, the optical connector housing moves by the housing slight-movement structure actuated by the first force to eliminate a deviation between the plurality of optical connector housings facing each other, and
the positions of the plurality of optical connector ferrules facing each other are adjusted by using second guide pins and second guide holes arranged on a joining surface of each of the plurality of optical connector ferrules on which the optical fiber end faces appear, the second guide pins being fitted to the second guide holes, a ferrule slight-movement structure that allows an optical connector ferrule of the plurality of optical connector ferrules to be movable in a direction parallel to the connection surface of the first connector unit and the connection surface of the second connector unit are used, and a pressing structure that applies pressing force such that the plurality of optical connector ferrules are in close contact with each other on a plurality of the joining surfaces, and when the second guide pins and the second guide holes of the plurality of optical connector ferrules facing each other are fitted together, second force is applied to the optical connector ferrule by deviations between the second guide pins and the second guide holes, the optical connector ferrule moves by the ferrule slight-movement structure actuated by the second force to eliminate a deviation between the plurality of optical connector ferrules facing each other, and the pressing structure applies the pressing force to the optical connector ferrule.

\* \* \* \* \*